United States Patent
Shaheen et al.

(10) Patent No.: US 7,630,709 B2
(45) Date of Patent: *Dec. 8, 2009

(54) FORMAT CONVERTER FOR WLAN-UMTS INTERWORKING EMPLOYING UMTS AIR INTERFACE

(75) Inventors: Kamel M. Shaheen, King of Prussia, PA (US); Leonid Kazakevich, Plainview, NY (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 11/433,958

(22) Filed: May 15, 2006

(65) Prior Publication Data

US 2006/0205403 A1    Sep. 14, 2006

Related U.S. Application Data

(63) Continuation of application No. 10/319,180, filed on Dec. 13, 2002, now Pat. No. 7,050,800.

(60) Provisional application No. 60/399,787, filed on Jul. 31, 2002.

(51) Int. Cl.
H04W 4/00 (2006.01)
(52) U.S. Cl. .................. 455/426.2; 455/435.1; 370/338
(58) Field of Classification Search ........................ None
See application file for complete search history.

(56) References Cited

U.S. PATENT DOCUMENTS

| | | | |
|---|---|---|---|
| 6,424,818 B1 | 7/2002 | Hirono | |
| 6,529,728 B1 | 3/2003 | Pfeffer et al. | |
| 6,687,243 B1 | 2/2004 | Sayers et al. | |
| 6,763,012 B1 | 7/2004 | Lord et al. | |
| 6,795,437 B1 | 9/2004 | Rasanen et al. | |
| 7,035,242 B2* | 4/2006 | Shaheen et al. | 370/338 |
| 7,050,800 B2* | 5/2006 | Shaheen et al. | 455/426.2 |
| 7,173,924 B2* | 2/2007 | Shaheen et al. | 370/338 |
| 2003/0118015 A1 | 6/2003 | Gunnarsson et al. | |
| 2003/0134650 A1 | 7/2003 | Sundar et al. | |

(Continued)

FOREIGN PATENT DOCUMENTS

JP    09-130862    5/1997

(Continued)

OTHER PUBLICATIONS

F. Ostrowski, "Roaming Und Handover Zwischen UMTS UNK FUNK-LAN," 2002, NTZ (Nachrichtentechnische Zeitschrift), VDE Verlag GMBH, pp. 24-26.

(Continued)

*Primary Examiner*—Erika A Gary
(74) *Attorney, Agent, or Firm*—Volpe and Koenig PC

(57) ABSTRACT

A format converter for use with a universal mobile telecommunications system (UMTS) having a transceiver, a wireless local area network (WLAN) having an access point (AP) and a wireless terminal, for providing access to the UMTS by the terminal. The format converter comprises a WLAN transceiver for sending and receiving messages to and from the AP; a UMTS transceiver for sending and receiving messages to and from the transceiver in the UMTS; and a translator for translating WLAN messages to UMTS format and UMTS messages to WLAN format.

14 Claims, 3 Drawing Sheets

U.S. PATENT DOCUMENTS

| | | | |
|---|---|---|---|
| 2003/0139180 A1 | 7/2003 | McIntosh et al. | |
| 2003/0171112 A1* | 9/2003 | Lupper et al. | 455/414.1 |
| 2004/0001468 A1 | 1/2004 | Bichot et al. | |
| 2005/0254469 A1* | 11/2005 | Verma et al. | |
| 2006/0050667 A1* | 3/2006 | Verma et al. | 370/338 |

FOREIGN PATENT DOCUMENTS

| | | |
|---|---|---|
| JP | 09-252486 | 9/1997 |
| JP | 09252486 | 9/1997 |
| JP | 10-304455 | 11/1998 |
| JP | 10304455 | 11/1998 |
| JP | 11-331171 | 11/1999 |
| JP | 2002-232956 | 8/2002 |
| WO | 02/19617 | 3/2002 |
| WO | 02/054820 | 7/2002 |

OTHER PUBLICATIONS

Gerdes M. et al, "TCP Performance Analysis of Inter-System Handover Between WLAN and A UMTS Radio Access Network," Oct. 6, 1999, ITG Fachberichte, VDE Verlag, pp. 345-349.

Shiao-Li Tsao et al., "Design and Evaluation of UMTS-WLAN Interworking Strategies," VTC 2002-Fall. 2002 IEEE 56th. Vehicular Technology Conference Proceedings. Vancouver, Canada, Sep. 24-28, 2002, IEEE Vehicular Technology Conference, New York: NY: IEEE, US, vol. 1 of 4. Conf. 56, Sep. 24, 2002, pp. 777-781.

Wu et al., "Intelligent Handoff for Mobile Wireless Internet," 2001, Mobile Networks and Applications 6, 67-79, Kluwer Academic Publishers.

Wu et al., "Intelligent Handoff for Mobile Wireless Internet," Mobile Networks and Applications 6, Kluwer Academic Publishers, pp. 67-76, (2001).

Dell'Uomo et al., "The Mobility and Authentication/Authorization Mechanisms in Networks Beyond 3G," Personal, Indoor and Mobile Radio Communications, 12th International Symposium, vol. 1, pp. C44-C48, (2001).

Dell'Uomo, et al., "The Mobility and Authentication/Authorization Mechanisms in Networks Beyond 3G," Personal, Indoor and Mobile Radio Communications, 12th International Symposium, vol. 1, pp. C44-C48, (2001).

Gerdes, et al., "TCP Performance Analysis of Inter-System Handover Between WLAN and A UMTS Radio Access Network," Oct. 6, 1999, ITG Fachberichte, VDE Verlag, pp. 345-349.

Ostrowski, "Roaming Und Handover Zwischen UMTS UNK FUNK-LAN," 2002, NTZ (Nachrichtentechnische Zeitschrift), VDE Verlag GMBH, pp. 24-26.

Shiao-Li Tsao, et al., "Design and Evaluation of UMTS-WLAN Interworking Strategies," VTC 2002-Fall. 2002 IEEE 56th. Vehicular Technology Conference Proceedings. Vancouver, Canada, Sep. 24-28, 2002, IEEE Vehicular Technology Conference, New York: NY: IEEE, US, vol. 1 of 4. Conf. 56, Sep. 24, 2002, pp. 777-781.

Wu, et al., "Intelligent Handoff for Mobile Wireless Internet," Mobile Networks and Applications 6, Kluwer Academic Publishers, pp. 67-76, (2001).

* cited by examiner

FORMAT CONVERTER FOR WLAN-UMTS INTERWORKING EMPLOYING UMTS AIR INTERFACE

CROSS REFERENCE TO RELATED APPLICATIONS

This application is a continuation of U.S. application Ser. No. 10/319,180, filed on Dec. 13, 2002, now U.S. Pat. No. 7,050,800 issued May 23, 2006, which claims priority from U.S. Provisional Application No. 60/399,787; filed on Jul. 31, 2002 which applications are incorporated herein by reference.

FIELD OF INVENTION

The present invention relates to wireless communications. More particularly the invention deals with WLAN-UMTS interworking.

BACKGROUND

Subscribers, such as mobile stations (UEs), to a universal mobile telecommunication system (UMTS) which are operating under a wireless local area network (WLAN) environment and desire to access the UMTS, can incur a significant increase in costs when accessing UMTSs in those areas where the UMTS system access would be of substantial cost.

SUMMARY

The present invention is a format converter provided with a transceiver acting as a UMTS radio front-end for a UMTS subscriber operating in a WLAN environment. The interface between the UMTS system and the end user (UE) is obtained through the WLAN interface.

The WLAN system converts received UMTS messages and/or traffic for pre-registered users into a format suitable for WLAN transmission to be delivered to users operating in WLAN environments. In addition, the WLAN converts transmitted messages and traffic flows into UMTS formats which is then transmitted to the UMTS system by way of the UMTS transceiver supporting the WLAN system. The WLAN users gain access to the UMTS system through a UMTS air interface employing a translator.

BRIEF DESCRIPTION OF THE FIGURES

The present invention will be understood from a consideration of the accompanying description and drawings in which like elements are designated by like numerals and, wherein.

DETAILED DESCRIPTION OF THE PREFERRED EMBODIMENTS

Figure 1:
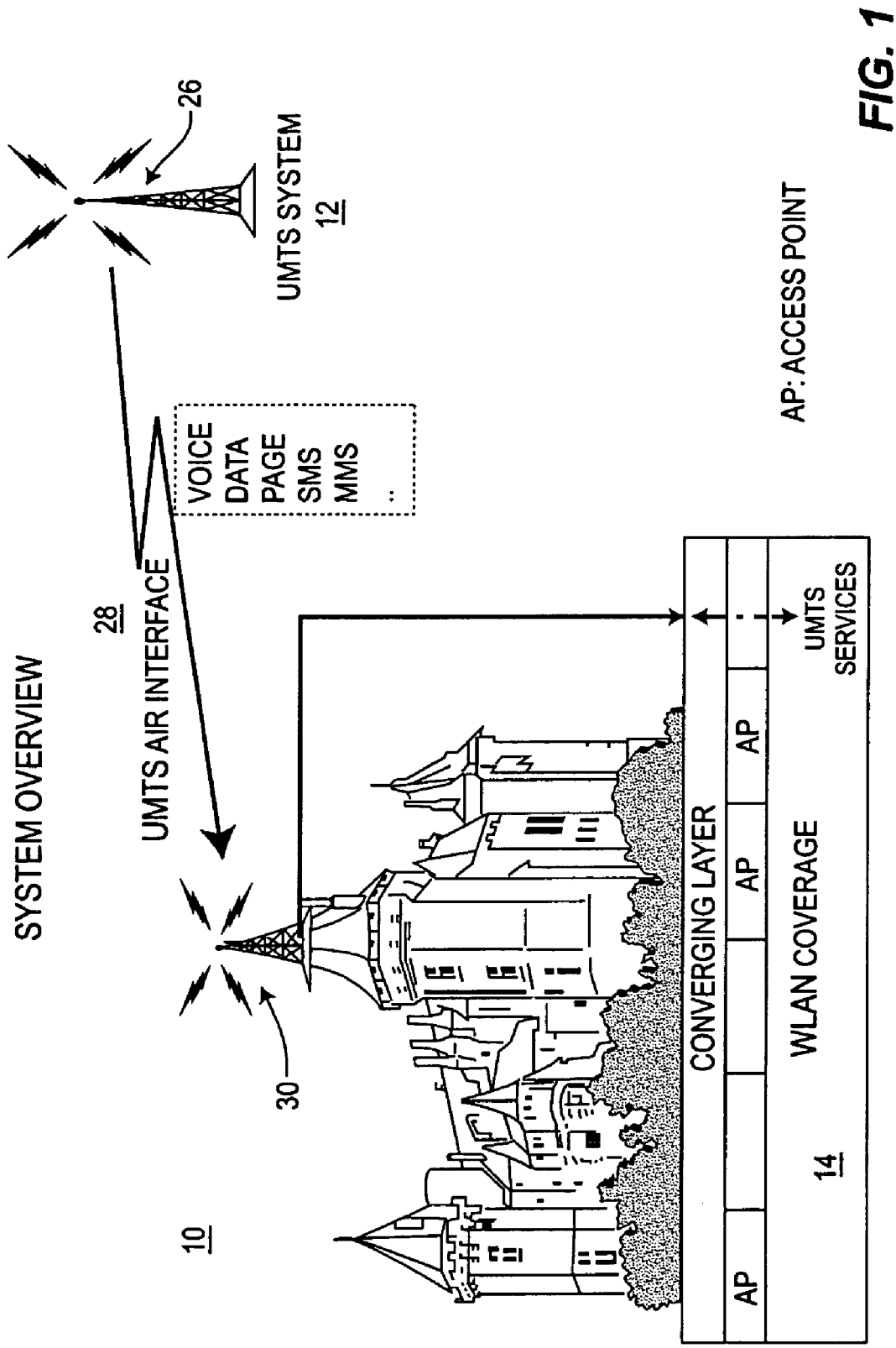
FIG. 1 is a diagram of a UMTS system underlayed by a WLAN system.

FIG. 1 shows an arrangement 10 useful in explaining the interworking between a UMTS system 12 and WLAN system 14. The arrangement of FIG. 1 will be described in conjunction with the technique for delivery of UMTS based services when a mobile station such as a remote terminal is served by the WLAN system.

Figure 2:
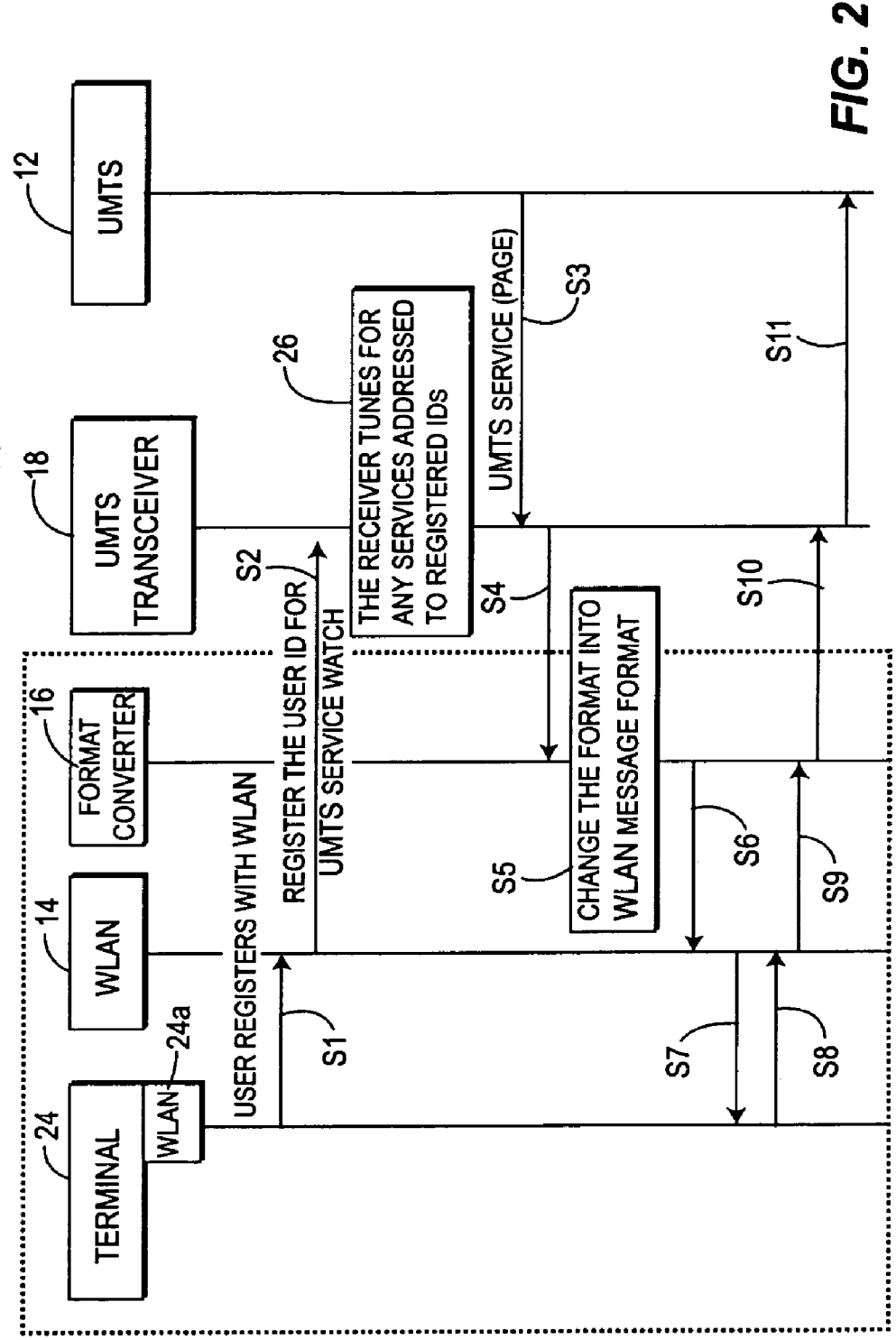
FIGS. 2 and 3 are diagrams showing the message utilized for the WLAN-UMTS interworking in accordance with the apparatus and methods of the present invention.

Making reference to FIG. 2, and, where appropriate, FIG. 1, there is shown an arrangement similar to that of FIG. 1.

Only one mobile station 24 is shown for purposes of simplicity, it being understood that a plurality of such mobile terminals are serviced by the WLAN 14. Although the mobile station remote terminal (UE) 24 may also be a dual-mode terminal capable of communicating with a WLAN and a UMTS, for purposes of the present invention, a WLAN-capable terminal 24 is utilized.

User terminal (UE) 24, through its WLAN capability 24a, registers with WLAN 14, by communicating with an access point (AP) of the WLAN (see FIG. 1) at step S1. WLAN 14, at step S2, then registers the user identification (ID) for the UMTS service watch, communicating with UMTS transceiver 18. UMTS transceiver 18 is tuned for any services addressed to registered users' identifications (IDs). When a UMTS service, such as a page, short message service (SMS), multimedia message service (MMS) or the like is to be delivered, UMTS 12 transfers such a service, in the example given a page message, at step S3, the page message being delivered to UMTS transceiver 18. UMTS transceiver 18, at step S4, typically from a radio tower 26, transmits the page message over UMTS air interface 28 to a receiving radio tower 30, to format converter 16 which, at step S5, converts the present (UMTS) format into a WLAN message format and, at step S6, communicates the page message, in WLAN message format, to WLAN 14. WLAN 14, at step S7, delivers the page message to mobile terminal 24. An acknowledgement is relayed from terminal 24, at step S8, to WLAN 14, the acknowledgement being transferred to format converter 16 at step S9 and from there to UMTS transceiver 18, at step S10, and finally to UMTS 12, at step S11.

Figure 3:
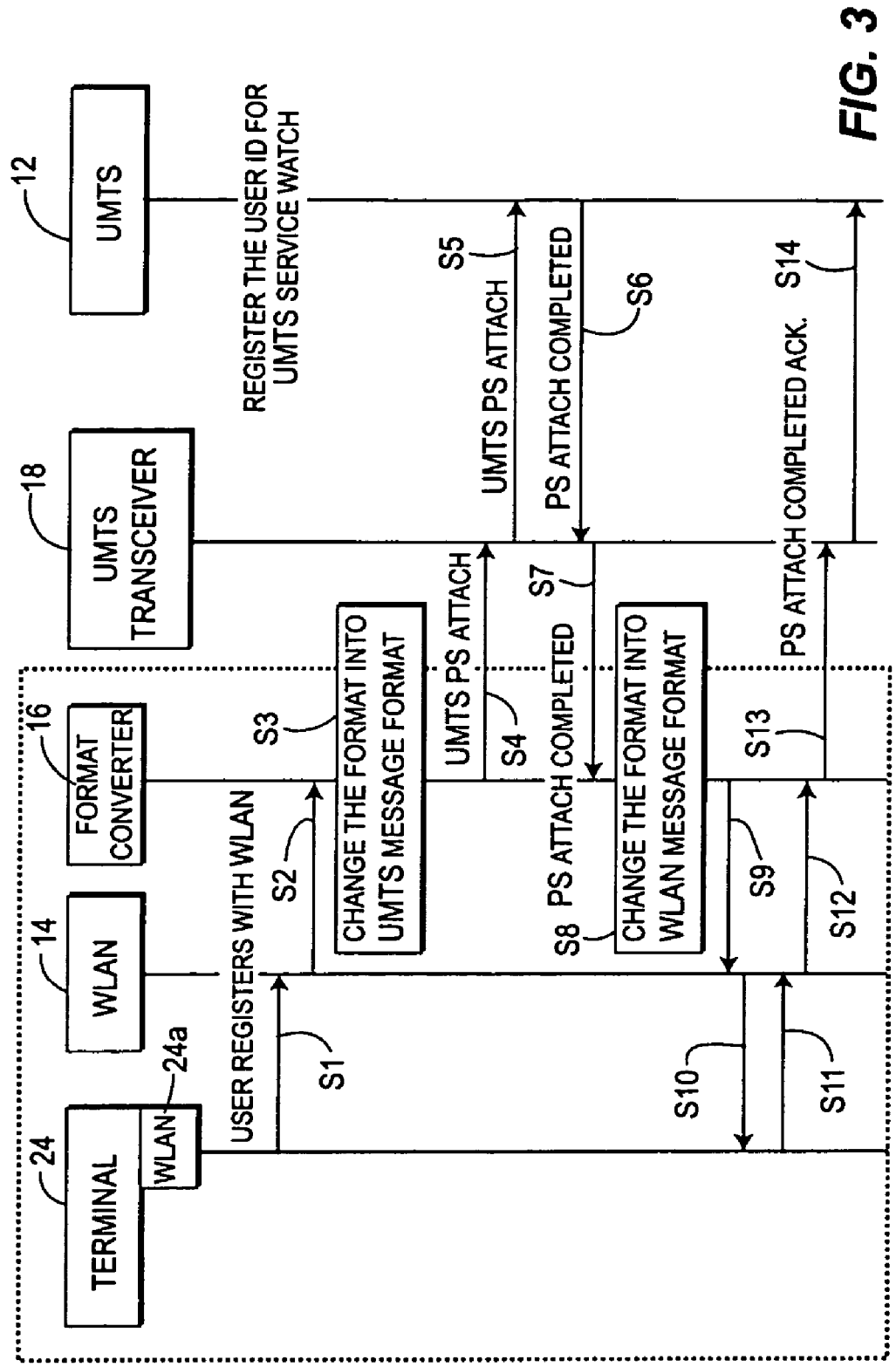

FIG. 3 shows a terminal 24 similar to that shown in FIG. 2, which, through its WLAN capability 24a, registers with WLAN 14, at step S1. The WLAN 14, at step S2, forwards the user registration to format converter 16 which, at step S3, changes the format into a UMTS message format and, at step S4, provides a UMTS package switched (PS) UMTS attachment directed to the UMTS transceiver 18. UMTS transceiver 18 transfers the UMTS PS attached to UMTS 12, at step S5.

The PS attach completed message is transferred from UMTS 12 to UMTS transceiver 18, at step S6, and from UMTS transceiver 18 to format converter 16, at step S7. Format converter 16, at step S8, changes the format of the PS attach into a WLAN message format and, at step S9, conveys the message to WLAN 14 which, at step S10, provides the message to mobile terminal 24. Acknowledgement from terminal 24 to WLAN 14 occurs at step S11, from WLAN 14 to format converter 16, at step S12, from format converter 16 to UMTS transceiver 18, at step S13 and the UMTS transceiver 18 to UMTS 12, at step S14, thereby completing the acknowledgment.

What is claimed is:

1. An apparatus for delivering universal mobile telecommunication system (UMTS) formatted messages to a dual mode user equipment (UE) associated with a wireless local area network (WLAN) access point, the apparatus comprising:

a format converter configured to receive UMTS formatted messages from a UMTS network over a UMTS air interface and to translate the received UMTS formatted messages to a WLAN format; and a WLAN interface configured to communicate the translated messages to the UE over a WLAN air interface.

2. The apparatus of claim 1, configured to register the UE with a UMTS base station responsive to the UE registering with the WLAN access point.

3. The apparatus of claim 2, further configured to provide a UMTS packet switched (PS) UMTS attach to the UMTS base station.

4. The apparatus of claim 1, wherein the format converter is further configured to translate WLAN formatted messages received from the UE over the WLAN air interface to a UMTS format, and to forward the translated message to the UMTS network over the UMTS air interface.

5. The apparatus of claim 1, wherein the messages are paging messages.

6. The apparatus of claim 1, wherein the messages are short message service (SMS) messages.

7. The apparatus of claim 1, wherein the messages are multimedia message service (MMS) messages.

8. An apparatus configured to deliver messages to a dual mode user equipment (UE) associated with a wireless local area network (WLAN) access point, the apparatus comprising:

a format converter configured to receive messages from a universal mobile telecommunication system (UMTS) network over a UMTS air interface and to translate the received UMTS formatted messages to a WLAN format; and a WLAN interface configured to communicate the translated messages to the UE over a WLAN air interface.

9. The apparatus of claim 8, configured to register the UE with a UMTS base station responsive to the UE registering with the WLAN access point.

10. The apparatus of claim 9, further configured to provide a UMTS packet switched (PS) UMTS attach to the UMTS base station.

11. The apparatus of claim 8, wherein the format converter is further configured to translate WLAN formatted messages received from the UE over the WLAN air interface to a UMTS format, and to forward the translated message to the UMTS network over the UMTS air interface.

12. The apparatus of claim 8, wherein the messages are paging messages.

13. The apparatus of claim 8, wherein the messages are short message service (SMS) messages.

14. The apparatus of claim 8, wherein the messages are multimedia message service (MMS) messages.

* * * * *